US012179719B2

(12) United States Patent
Boo et al.

(10) Patent No.: US 12,179,719 B2
(45) Date of Patent: Dec. 31, 2024

(54) BRAKE APPARATUS FOR VEHICLE

(71) Applicant: HYUNDAI MOBIS Co., Ltd., Seoul (KR)

(72) Inventors: Sang Pil Boo, Yongin-si (KR); Choong Sik Shin, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 336 days.

(21) Appl. No.: 17/740,775

(22) Filed: May 10, 2022

(65) Prior Publication Data

US 2023/0166697 A1  Jun. 1, 2023

(30) Foreign Application Priority Data

Nov. 26, 2021  (KR) .................. 10-2021-0165353

(51) Int. Cl.
B60T 1/06        (2006.01)
B60T 13/74       (2006.01)
(Continued)

(52) U.S. Cl.
CPC ............ B60T 1/065 (2013.01); B60T 13/746 (2013.01); F16D 55/226 (2013.01); F16D 65/18 (2013.01);
(Continued)

(58) Field of Classification Search
CPC ........ B60T 1/005; B60T 1/065; B60T 13/741; B60T 13/746; F16D 55/226;
(Continued)

(56) References Cited

U.S. PATENT DOCUMENTS

2016/0377137 A1* 12/2016 Ohlig .................... B60T 13/746
                                                      188/106 F
2017/0114848 A1*  4/2017 Park ..................... B60T 13/741
(Continued)

FOREIGN PATENT DOCUMENTS

KR    10-2010-0098846 A    9/2010
KR    10-2019-0043713 A    4/2019
(Continued)

OTHER PUBLICATIONS

English machined translation of KR-20190043713 (Apr. 29, 2019).*
(Continued)

Primary Examiner — Robert A. Siconolfi
Assistant Examiner — San M Aung
(74) Attorney, Agent, or Firm — Morgan, Lewis & Bockius LLP

(57) ABSTRACT

A brake apparatus for a vehicle may include: a first driver and a second driver each configured to generate a driving force; a transfer gear part rotated by the driving force received from the first driver; a piston part configured to
(Continued)

press or release a pad part according to the direction in which the piston part is moved forward or backward; a parking gear part rotated with the transfer gear part; a constraint part moved forward or backward by the driving force of the second driver, and configured to constrain the rotation of the parking gear part by being moved to one side during parking braking; and a locking part configured to transfer the driving force, generated by the second driver, to the constraint part, and to restrict the constraint part from moving to the other side during parking braking.

15 Claims, 11 Drawing Sheets

(51) Int. Cl.
    *F16D 55/226*     (2006.01)
    *F16D 65/18*     (2006.01)
    *F16D 66/00*     (2006.01)
    *F16D 121/24*     (2012.01)
    *F16D 125/40*     (2012.01)
    *F16D 125/48*     (2012.01)
    *F16D 127/06*     (2012.01)

(52) U.S. Cl.
    CPC .......... *F16D 66/00* (2013.01); *F16D 2121/24* (2013.01); *F16D 2125/40* (2013.01); *F16D 2125/48* (2013.01); *F16D 2127/06* (2013.01)

(58) Field of Classification Search
    CPC ........ F16D 63/006; F16D 65/18; F16D 66/00; F16D 2121/24; F16D 2125/40; F16D 2125/48; F16D 2127/06
    USPC ...................................................... 188/72.3
    See application file for complete search history.

(56) References Cited

U.S. PATENT DOCUMENTS

2017/0167553 A1\*   6/2017   Sim .......................... F16D 65/18
2021/0207710 A1\*   7/2021   Schmidt ................... F16H 63/08

FOREIGN PATENT DOCUMENTS

| KR | 10-2145987 B1 | 8/2020 | |
|---|---|---|---|
| KR | 10-2021-0048782 A | 5/2021 | |
| KR | 10-2021-0123124 A | 10/2021 | |
| WO | WO-2020001778 A1 \* | 1/2020 | .............. B60T 1/005 |
| WO | WO-2020217788 A1 \* | 10/2020 | ............ B60T 13/746 |

OTHER PUBLICATIONS

English machined translation of KR-20210123124 (2021-10-2013).\*
English machined translation of KR-20210048782 (May 4, 2021).\*
Office Action issued in corresponding Korean Patent Application No. 10-2021-0165353 dated May 30, 2023, with English translation.

\* cited by examiner

BRAKE APPARATUS FOR VEHICLE

CROSS-REFERENCE TO RELATED APPLICATION

This application claims priority from and the benefit of Korean Patent Application No. 10-2021-0165353, filed on Nov. 26, 2021, which is hereby incorporated by reference for all purposes as if set forth herein.

BACKGROUND

Field

Exemplary embodiments of the present disclosure relate to a brake apparatus for a vehicle, and more particularly, to a brake apparatus for a vehicle, which generates a braking force by converting a pedal operation force of a driver into an electrical signal.

Discussion of the Background

In general, a brake apparatus for a vehicle refers to an apparatus which pushes a piston with a driving force such that a pad and a disk are pressed against each other, and brakes a vehicle by using the frictional force between the pad and the disk.

Among the brake apparatuses, EMB (Electro Mechanical Brake) refers to an apparatus which has a motor driving actuator directly mounted on a caliper without using hydraulic pressure, and presses a piston through a mechanism such as a gear or screw, thereby generating a braking force. The EMB can perform active braking and independent braking for each wheel, and thus implement various additional functions such as ABS, ESC, TCS and AEB as well as a main braking function, thereby implementing higher performance without hydraulic pressure transfer delay.

The conventional EMB secures quick responsiveness and high efficiency of the piston through a ball screw. However, such a ball screw cannot perform a self locking function capable of restricting its own rotation, due to the structural characteristics thereof. Thus, when power supplied to a motor is cut off, a braking force may be randomly released by a repulsive force between the pad and the piston.

The related art of the present disclosure is disclosed in Korean Patent Application Laid-Open No. 10-2010-0098846 published on Sep. 10, 2010 and entitled "Disk Brake Having Parking Function".

SUMMARY

Various embodiments are directed to a brake apparatus for a vehicle, which can stably maintain a parking braking state.

In an embodiment, a brake apparatus for a vehicle may include: a first driver and a second driver each configured to generate a driving force; a transfer gear part rotated by the driving force received from the first driver; a piston part moved forward or backward in connection with a rotation of the transfer gear part, and configured to press or release a pad part according to a direction in which the piston part is moved forward or backward; a parking gear part rotated with the transfer gear part; a constraint part moved forward or backward by the driving force of the second driver, and configured to constrain a rotation of the parking gear part by being moved to one side during parking braking; and a locking part configured to transfer the driving force, generated by the second driver, to the constraint part, and to restrict the constraint part from moving to the other side during parking braking.

The constraint part may include: a body part configured to linearly reciprocate between the second driver and the parking gear part; a constraint member extending from the body part, and brought into surface contact with the parking gear part, as the body part is moved by a predetermined distance or more toward the parking gear part; and a guide part configured to abut on the constraint member, and to guide a movement of the body part.

The constraint member may include: a first constraint member brought into contact with one surface of the parking gear part; and a second constraint member spaced apart from the first constraint member so as to face the first constraint member, and brought into contact with another surface of the parking gear part.

The first constraint member and the second constraint member may be disposed in parallel to each other.

The first constraint member and the second constraint member may be spaced apart, by a width of the parking gear part, from each other.

The locking part may include: a first locking member connected to and rotated by an output shaft of the second driver; and a second locking member protruding from the constraint part, and configured to convert a rotational motion of the first locking member into a linear motion by being engaged with the first locking member.

The first locking member and second locking member may be engaged with each other, and when an operation of the second driver is stopped, the second locking member constrains a rotation of the output shaft of the second driver.

The first locking member may be provided in a shape of a worm gear.

Any one of the first locking member or the second locking member may be provided in a shape of a ball screw, and a remaining one of the first locking member of the second locking member may be provided in a shape of a nut screw.

The brake apparatus may further include an adjuster connected to the constraint part, and configured to limit a moving range of the constraint part toward the parking gear part.

The adjuster may include: a load application part configured to apply a load to the constraint part in an opposite direction of a moving direction of the constraint part in proportion to a moving distance of the constraint part; a measurement part configured to measure a current value of the second driver; and a control part configured to stop an operation of the second driver when the current value of the second driver, measured by the measurement part, exceeds a preset magnitude.

The load application part may be elastically deformable in a direction parallel to the moving direction of the constraint part.

The transfer gear part may include: a first transfer gear part rotated with an output shaft of the first driver; a second transfer gear part engaged and coupled with the first transfer gear part, and rotated in connection with a rotation of the first transfer gear part; and a third transfer gear part engaged and coupled with the second transfer gear part, rotated in connection with a rotation of the second transfer gear part, and configured to transfer a rotational force to the piston part.

The parking gear part may be connected to the output shaft of the first driver, and rotated at a same angular velocity as the first transfer gear part.

The parking gear part may have a polygonal cross-section.

The piston part may include: a ball screw connected to and rotated by the transfer gear part; a ball nut configured to linearly reciprocate in a longitudinal direction of the ball screw in connection with a rotation of the ball screw; and one or more rolling bodies arranged between the ball screw and the ball nut, and configured to come into rolling contact with the ball screw and the ball nut.

In accordance with the embodiment of the present disclosure, the brake apparatus for a vehicle may prevent the piston part from randomly separating from the pad part and losing a braking force, even though the operation of the driver is stopped by the constraint part during parking braking.

Furthermore, as the parking gear part is connected to the output shaft of the first driver and rotated at the same angular velocity as the first transfer gear part, it is possible to reduce the magnitude of a load applied to the constraint part, compared to when the parking gear part is connected to the second or third transfer gear part having a rotational force boosted by a gear ratio.

Furthermore, the brake apparatus may transfer a driving force, generated by the locking parking, to the constraint part. Simultaneously, when the operation of the second driver 300 is stopped, the brake apparatus may prevent the output shaft of the second driver from randomly rotating in the reverse direction, through a self locking operation, thereby more stably maintaining the parking braking state.

Furthermore, the brake apparatus may limit the moving range of the constraint part through the adjuster, thereby preventing damage to parts by a collision between the constraint part and the parking gear part during parking braking.

DETAILED DESCRIPTION OF THE ILLUSTRATED EMBODIMENTS

Figure 1:
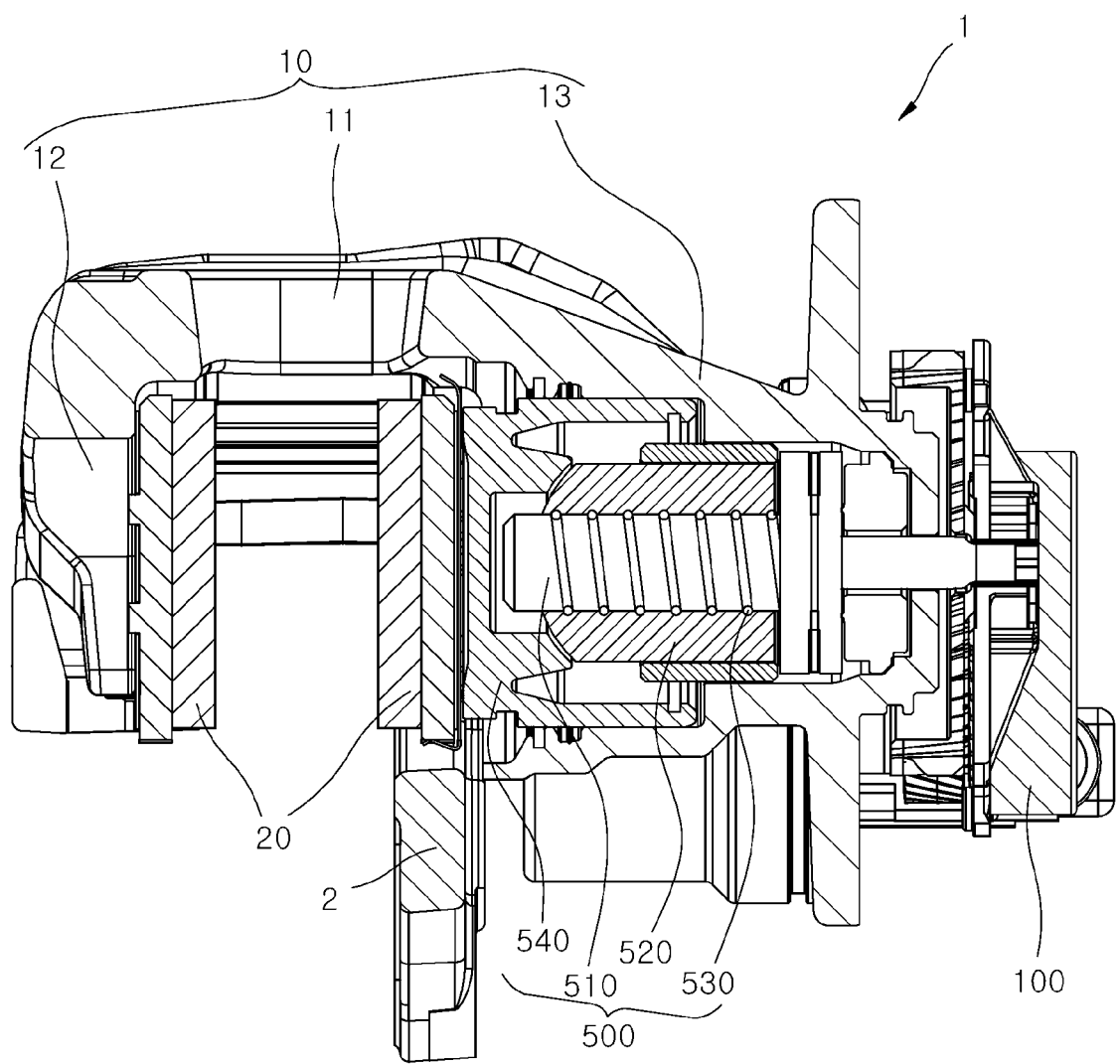
FIG. 1 is a cross-sectional view schematically illustrating the configuration of a brake apparatus for a vehicle in accordance with an embodiment of the present disclosure.

Hereinafter, a brake apparatus for a vehicle will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Throughout the specification, when one element is referred to as being "connected to" or "coupled to" another element, it may indicate that the one element is "directly connected or coupled to" the another element or the one element is "indirectly connected or coupled to" with still another element interposed therebetween. In this specification, when an element "includes or has" a component, it may indicate that the element does not exclude another component but can further include or have another component, unless referred to the contrary.

Through this specification, like reference numerals may represent the same components. Although like or similar reference numbers are not mentioned or described in a specific drawing, the reference numerals may be described with reference to other drawings. Furthermore, although a component is not represented by a reference numeral in a specific drawing, the component may be described with reference to other drawings. Furthermore, the number, shape and size of sub components included in the drawings of this application and the relative difference between sizes are set for convenience of description, and may not limit embodiments but may be set to various values.

Figure 2:
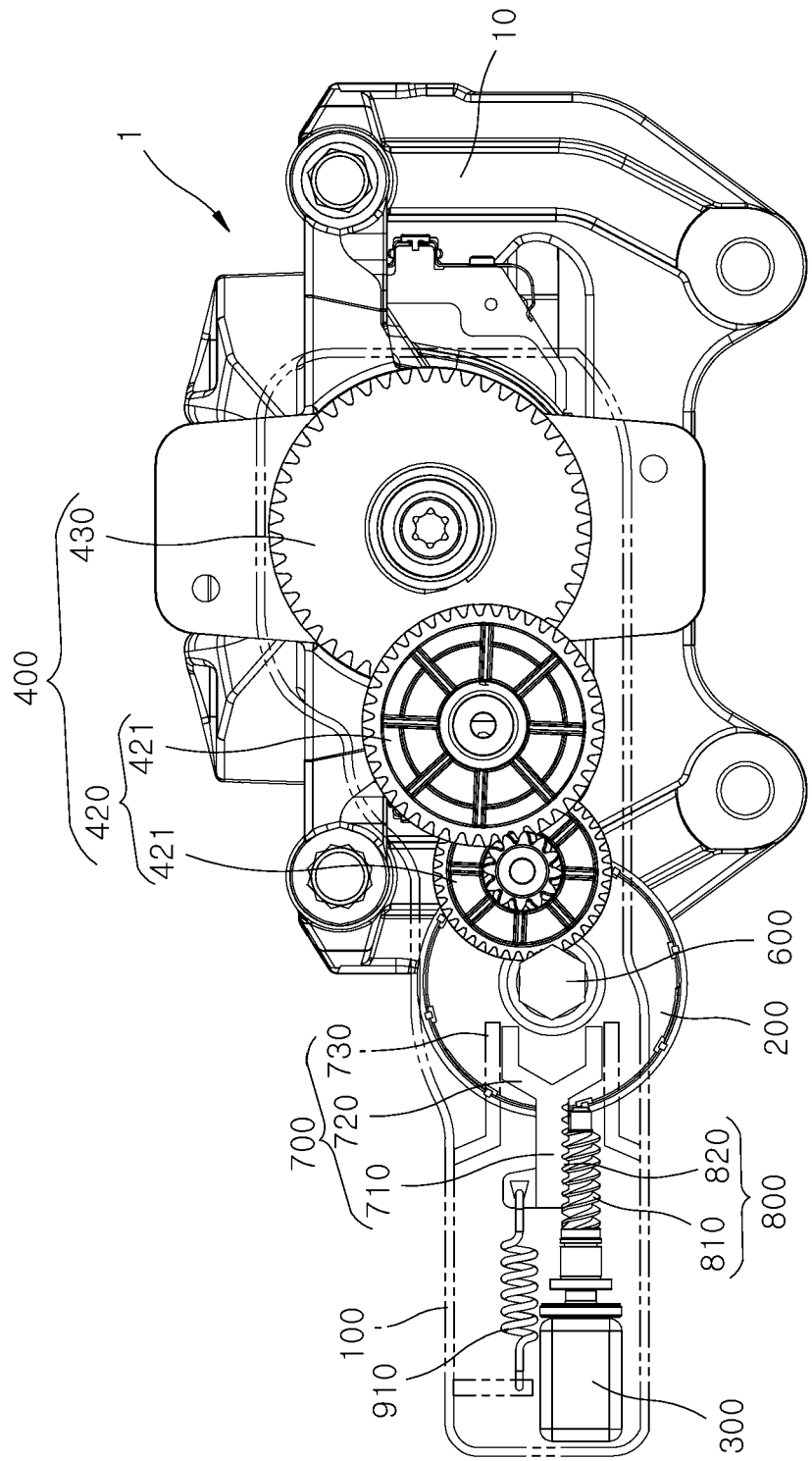
FIG. 2 is a front view schematically illustrating the configuration of the brake apparatus for a vehicle in accordance with the embodiment of the present disclosure.
Figure 3:
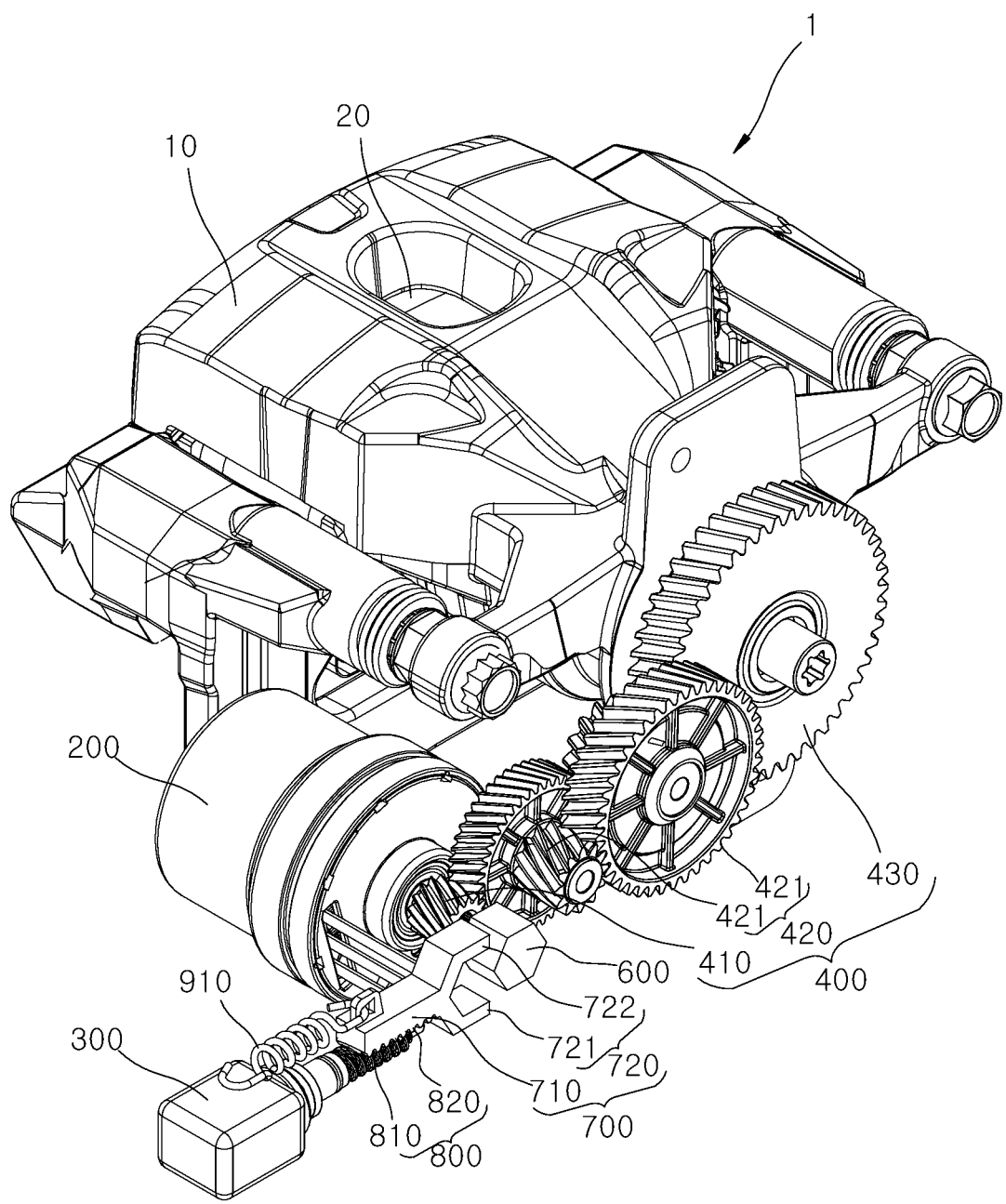
FIG. 3 is a perspective view schematically illustrating the configuration of the brake apparatus for a vehicle in accordance with the embodiment of the present disclosure.

FIG. 1 is a cross-sectional view schematically illustrating the configuration of a brake apparatus for a vehicle in accordance with an embodiment of the present disclosure, FIG. 2 is a front view schematically illustrating the configuration of the brake apparatus for a vehicle in accordance with the embodiment of the present disclosure, and FIG. 3 is a perspective view schematically illustrating the configuration of the brake apparatus for a vehicle in accordance with the embodiment of the present disclosure.

Referring to FIGS. 1 and 3, a brake apparatus 1 for a vehicle in accordance with an embodiment of the present disclosure includes a caliper body part 10, a pad part 20, a housing 100, a first driver 200, a second driver 300, a transfer gear part 400, a piston part 500, a parking gear part 600, a constraint part 700, a locking part 800, and an adjuster 900.

The caliper body part 10 is fixed to a vehicle body through a torque member 2, and supports the pad part 20, the housing 100, and the piston part 500 which will be described below. The caliper body part 10 is slidably coupled to the torque member 2 in a direction parallel to the axial direction of a brake disk (not illustrated) through guide pins connected to both sides thereof. The caliper body part 10 is movably supported by the torque member 2 through the guide pins connected to both sides thereof. The caliper body part 10 is slid in the direction parallel to the axial direction of the brake disk by a reaction force which is generated as the piston part 500 to be described below presses the pad part 20.

The caliper body part 10 in accordance with the embodiment of the present disclosure includes a bridge part 11, a finger part 12, and a cylinder part 13.

The bridge part 11 forms the upper exterior of the caliper body part 10. The bridge part 11 in accordance with the embodiment of the present disclosure may be formed in the shape of a plate whose inner surface is spaced apart by a predetermined distance from the outer circumferential surface of the brake disk, while facing the outer circumferential surface of the brake disk. The specific shape and area of the bridge part 11 may be variously changed in design depending on the size of the brake disk or the like.

The finger part 12 forms the front exterior of the caliper body part 10, and presses or releases the pad part 20, which will be described below, in connection with the sliding movement of the caliper body part 10. The finger part 12 in accordance with the embodiment of the present disclosure is vertically extended downward from the front end of the bridge part 11. The finger part 12 has an inner surface facing the pad part 20 which is disposed outside the brake disk in a widthwise direction of the vehicle, between the pair of pad parts 20.

The cylinder part 13 forms the rear exterior of the caliper body part 10, and movably supports the piston part 500 which will be described below. The cylinder part 13 in accordance with the embodiment of the present disclosure is vertically extended downward from the rear end of the bridge part 11. The cylinder part 13 is formed in a hollow cylindrical shape whose one side is open. The open side of the cylinder part 13 faces the pad part 20 which is disposed inside the brake disk in the widthwise direction of the vehicle, between the pair of pad parts 20.

The pair of pad parts 20 are disposed so as to face the brake disk which is rotated with a wheel of the vehicle. The pair of pad parts 20 are disposed so as to face both side surfaces of the brake disk, respectively, with the brake disk interposed therebetween. The pad part 20 is supported by the caliper body part 10 so as to slide in the direction parallel to the center axis of the brake disk. The pad part 20 is pressed against or separated from the brake disk by a pressing force applied from the caliper body part 10 and the piston part 500 which will be described below, and thus generates or removes a braking force for the vehicle. A friction pad made of a material with a high frictional coefficient, such as rubber, may be attached to one surface of the pad part 20 facing the brake disk. The specific shape of the pad part 20 is not limited to that illustrated in FIGS. 1 and 2, but may be variously changed in design as long as the pad part 20 can be pressed against the brake disk and apply a braking force to the vehicle.

The housing 100 is coupled to the caliper body part 10, and supports the first driver 200, the second driver 300, the transfer gear part 400, the parking gear part 600, and the constraint part 700, which will be described below. The housing 100 in accordance with the embodiment of the present disclosure is coupled to the rear surface of the caliper body part 10, or specifically the rear surface of the cylinder part 13. The housing 100 may be detachably coupled to the cylinder part 13 through bolting or the like, or integrated with the cylinder part 13 through welding or the like. The housing 100 is formed in a hollow shape, and has an internal space in which the first driver 200, the transfer gear part 400, the parking gear part 600, and the constraint part 700 can be installed. The housing 100 may be opened/closed so that the components installed therein can be easily managed.

The first driver 200 is coupled to and supported by the housing 100, and generates a driving force by using power received from the outside. The first driver 200 may be electrically connected to a battery of the vehicle or the like, and receive power. The first driver 200 in accordance with the embodiment of the present disclosure may be exemplified as various types of electric motors which generate a rotational force by using received power.

The second driver 300 is coupled to and supported by the housing 100, and generates a driving force by using power received from the outside. The second driver 300 may be electrically connected to the battery of the vehicle or the like, and receive power. The second driver 300 in accordance with the embodiment of the present disclosure may be exemplified as various types of electric motors which generate a rotational force by using received power. The second driver 300 may have an output shaft disposed in a direction perpendicular to an output shaft of the first driver 200. The operation state of the second driver 300 may be controlled by a control part 930 which will be described below.

The transfer gear part 400 is rotated by a driving force received from the first driver 200, and transfers the driving force generated from the first driver 200 to the piston part 500 to be described below.

The transfer gear part 400 in accordance with the embodiment of the present disclosure includes a first transfer gear part 410, a second transfer gear part 420, and a third transfer gear part 430.

The first transfer gear part 410 is connected to the output shaft of the first driver 200, and rotated with the output shaft of the first driver 200. The first transfer gear part 410 in accordance with the embodiment of the present disclosure may be formed in the shape of a hollow helical gear or spur gear which has teeth provided on the outer circumferential surface thereof. The first transfer gear part 410 has a central portion inserted onto and supported by the output shaft of the first driver 200. The central axis of the first transfer gear part 410 is disposed coaxially with the output shaft of the first driver 200. During an operation of the first driver 200, the first transfer gear part 410 is rotated at the same angular velocity as the output shaft of the first driver 200.

The second transfer gear part 420 is engaged and coupled with the first transfer gear part 410, and rotated in connection with the rotation of the first transfer gear part 410.

The second transfer gear part 420 in accordance with the embodiment of the present disclosure may include a plurality of second transfer gears 421.

The second transfer gear 421 may be formed in the shape of a hollow helical gear or spur gear which has teeth provided on the outer circumferential surface thereof. The plurality of second transfer gears 421 are sequentially engaged and coupled from the first transfer gear part 410 toward the third transfer gear part 430 which will be described below. In this case, the outer circumferential surfaces of the second transfer gears 421 may be each directly engaged with the outer circumferential surface of the neighboring second transfer gear 421, or engaged with the neighboring second transfer gear 421 through a separate small-diameter gear. The second transfer gear 421 disposed at one end among the plurality of second transfer gears 421 is engaged and coupled with the first transfer gear part 410. The center axes of the plurality of second transfer gears 421 are disposed in parallel to the central axis of the first transfer gear part 410. The diameters of the plurality of second transfer gears 421 may have an ascending relationship from the first transfer gear part 410 toward the third transfer gear part 430. Thus, the plurality of second transfer gears 421 may boost the magnitude of the rotational force transferred from the first transfer gear part 410 to the third transfer gear part 430. FIG. 2 illustrates that two second transfer gears 421 are provided. However, the number of the second transfer gears 421 is not limited thereto, but may be changed in design to various values such as three and four.

The third transfer gear part 430 is engaged and coupled with the second transfer gear part 420. The third transfer gear part 430 is rotated in connection with the rotation of the second transfer gear part 420, and transfers a rotational force to the piston part 500 which will be described below. The third transfer gear part 430 in accordance with the embodiment of the present disclosure may be formed in the shape of a hollow helical gear or spur gear which has teeth provided on the outer circumferential surface thereof. The third transfer gear part 430 has an outer circumferential surface engaged and coupled with the second transfer gear 421 disposed at the other end among the plurality of second transfer gears 421. In this case, the outer circumferential surface of the third transfer gear part 430 may be directly engaged with the outer circumferential surface of the second transfer gear part 420, or engaged with the second transfer gear part 420 through a separate small-diameter gear. The central axis of the third transfer gear part 430 is disposed in parallel to the central axis of the second transfer gear part 420. The third transfer gear part 430 may have a central axis connected to the piston part 500 which will be described below, and transfer a rotational force to the piston part 500 when rotated on the central axis thereof. The third transfer gear part 430 has a larger diameter than the second transfer gear part 420. Thus, when the second transfer gear part 420 is rotated, the third transfer gear part 430 may be rotated at a lower angular velocity than the second transfer gear part 420, and boost the magnitude of the rotational force transferred to the piston part 500.

The piston part 500 is movably installed on the caliper body part 10. The piston part 500 is moved forward or backward in connection with the rotation of the transfer gear part 400. The piston part 500 applies or removes a braking force while pressing or releasing the pad part 20 against or from the brake disk according to the direction in which the piston part 500 is moved forward or backward.

The piston part 500 in accordance with the embodiment of the present disclosure includes a ball screw 510, a ball nut 520, a rolling body 530, and a piston member 540.

The ball screw 510 is connected to and rotated by the transfer gear part 400. The ball screw 510 in accordance with the embodiment of the present disclosure is formed in substantially a rod shape, and rotatably installed in the cylinder part 13. The longitudinal direction of the ball screw 510 is set in parallel to the longitudinal direction of the cylinder part 13. The ball screw 510 has a rear end connected to the third transfer gear part 430, and axially rotated on the central axis thereof, when the third transfer gear part 430 is rotated. The ball screw 510 has a groove formed on the outer circumferential surface thereof, such that a half of the circumference of the rolling body 530 to be described below is seated in the groove. Such a groove is extended helically in the longitudinal direction of the ball screw 510, and provides a cyclic path of the rolling body 530.

The ball nut 520 is linearly reciprocated in the longitudinal direction of the ball screw 510 in connection with the rotation of the ball screw 510. The ball nut 520 in accordance with the embodiment of the present disclosure may be formed in a hollow cylindrical shape to cover the outer circumferential surface of the ball screw 510. The ball nut 520 has an inner circumferential surface which is spaced apart by a predetermined distance from the outer circumferential surface of the ball screw 510 while facing the outer circumferential surface of the ball screw 510. When the ball screw 510 is rotated, the ball nut 520 is linearly reciprocated from front to rear in the longitudinal direction of the ball screw 510 by the cyclic movement of the rolling body 530 which will be described below. The ball nut 520 has a groove formed on the inner circumferential surface thereof, such that the other half of the circumference of the rolling body 530 to be described below is seated in the groove. Such a groove is extended helically in the longitudinal direction of the ball nut 520, and provides the cyclic path of the rolling body 530.

The rolling body 530 is provided between the ball screw 510 and the ball nut 520, and has both sides that come into rolling contact with the ball screw 510 and the ball nut 520, respectively. The rolling body 530 in accordance with the embodiment of the present disclosure is formed in substantially a spherical shape, and installed between the ball screw 510 and the ball nut 520. The entire circumference of the rolling body 530 comes into rolling contact with the grooves formed on the outer circumferential surface of the ball screw 510 and the inner circumferential surface of the ball nut 520. The rolling body 530 is cyclically moved along the grooves when the ball screw 510 is rotated, and converts the rotational motion of the ball screw 510 into the linear reciprocation of the ball nut 520.

The piston member 540 is linearly reciprocated with the ball nut 520, and presses or releases the pad part 20 depending on the moving direction. The piston member 540 in accordance with the embodiment of the present disclosure is slidably installed in the cylinder part 13. The piston member 540 has a rear end coupled to the front end of the ball nut 520, and is linearly reciprocated in the longitudinal direction of the cylinder part 13 with the ball nut 520. As the ball nut 520 is moved forward, the front end of the piston member 540 is brought into contact with the pad part 20, and presses the pad part 20 toward the brake disk. As the ball nut 520 is moved backward, the piston member 540 is separated from the pad part 20 and releases the pad part 20.

The parking gear part 600 is rotated with the transfer gear part 400. More specifically, the parking gear part 600 may be connected to the output shaft of the first driver 200, and rotated at the same angular velocity as the first transfer gear part 410. Thus, the parking gear part 600 may reduce the magnitude of a load applied to the constraint part 700 which will be described below, compared to when the parking gear part 600 is connected to the second or third transfer gear part 420 or 430 having a rotational force boosted by a gear ratio. The parking gear part 600 in accordance with the embodiment of the present disclosure is fitted onto an end of the output shaft of the first driver 200, and rotated with the first transfer gear part 410. The central axis of the parking gear part 600 is disposed coaxially with the output shaft of the first driver 200. The parking gear part 600 may have a polygonal cross-section. Thus, when brought into contact with the constraint part 700 which will be described, the parking gear part 600 may be locked and coupled to the constraint part 700 and thus prevented from rotating relative to the constraint part 700. FIG. 2 illustrates that the parking gear part 600 has a hexagonal cross-section. However, the parking gear part 600 is not limited thereto, but may be changed in design in various shapes such as a rectangular or octagonal shape.

The constraint part 700 is moved forward or backward in connection with the driving force of the second driver 300. During parking braking, the constraint part 700 is moved toward one side, i.e. the parking gear part 600 by the driving force of the second driver 300, and constrains the rotation of the parking gear part 600. Thus, although the operation of the first driver 200 is stopped during parking braking, the constraint part 700 may prevent a loss in braking force, which occurs when the piston part 500 is randomly separated from the pad part 20.

Figure 4:
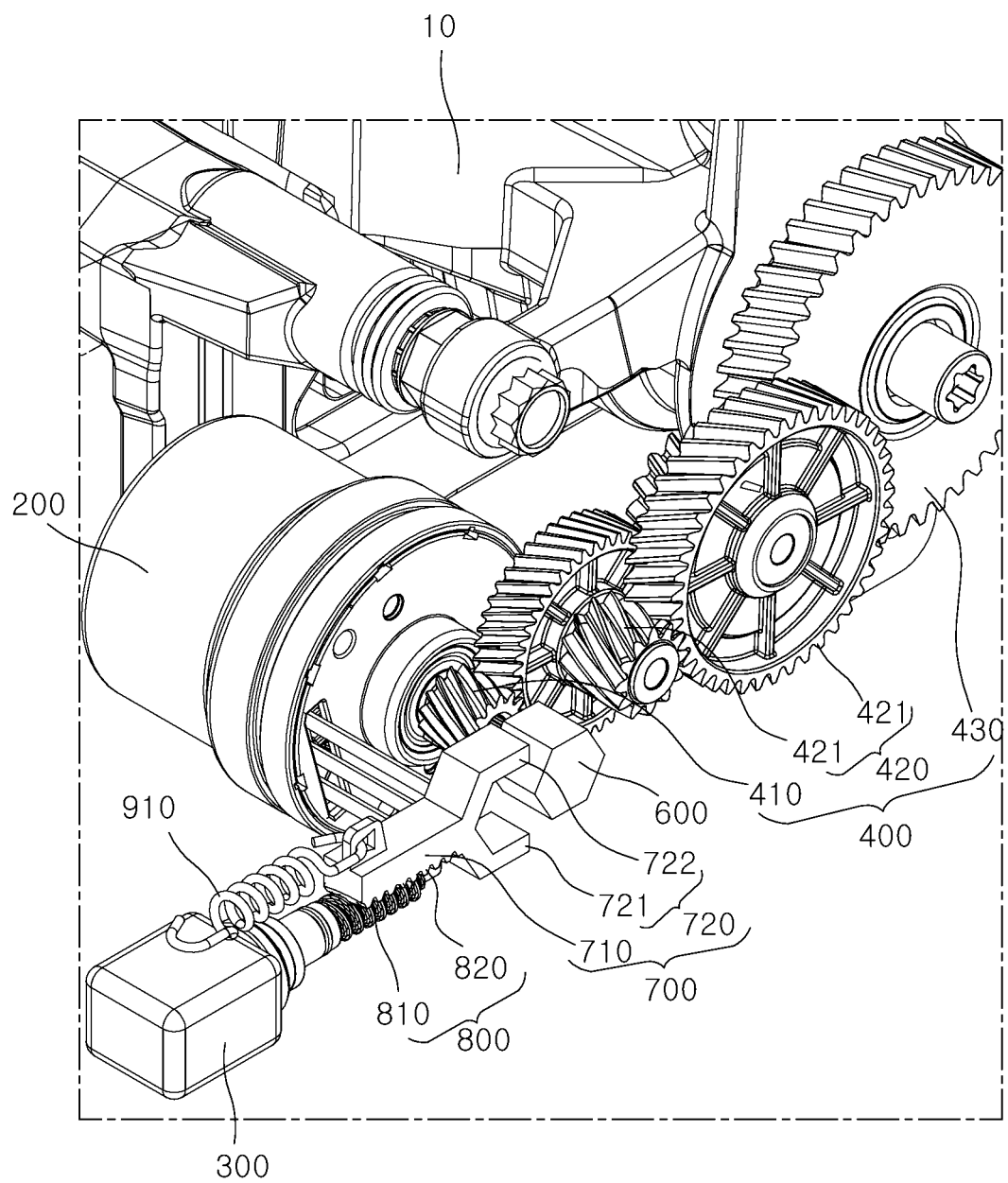
FIG. 4 is an expanded view schematically illustrating the configuration of a constraint part in accordance with the embodiment of the present disclosure.
Figure 5:
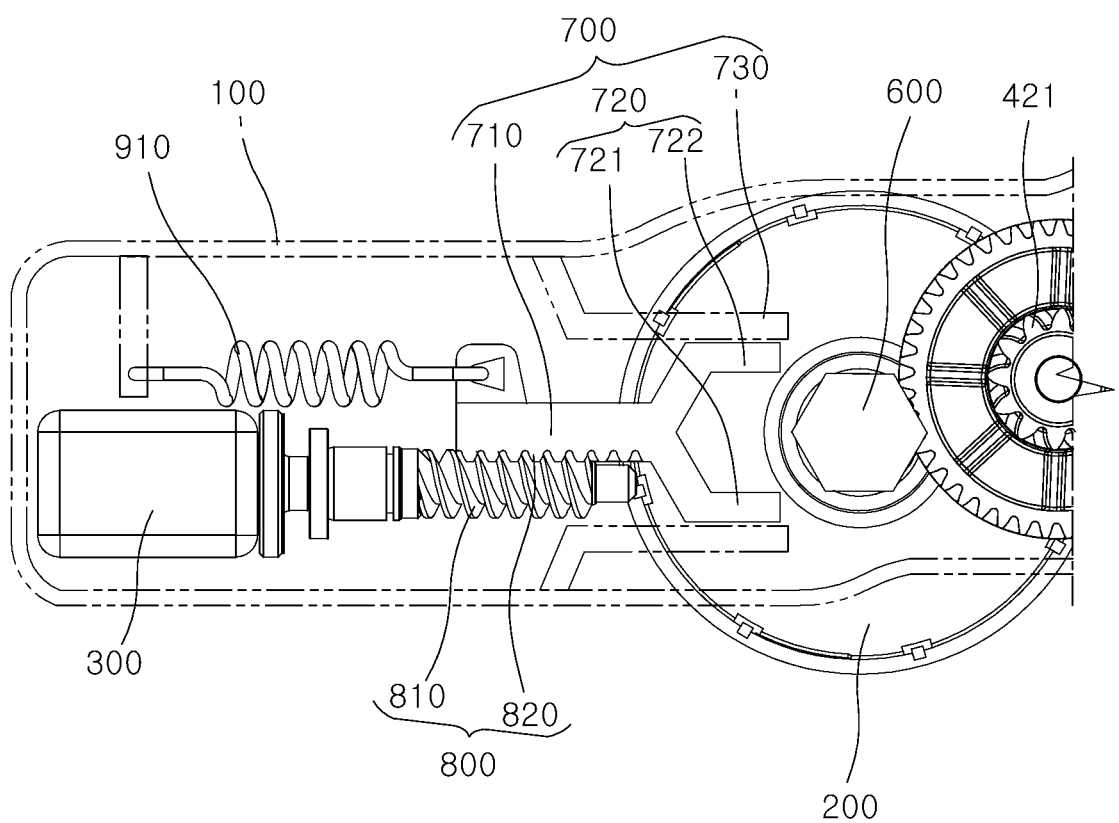
FIG. 5 is a front view schematically illustrating the configuration of the constraint part in accordance with the embodiment of the present disclosure.

FIG. 4 is an expanded view schematically illustrating the configuration of the constraint part in accordance with the embodiment of the present disclosure, and FIG. 5 is a front view schematically illustrating the configuration of the constraint part in accordance with the embodiment of the present disclosure.

Referring to FIGS. 1 to 5, the constraint part 700 in accordance with the embodiment of the present disclosure includes a body part 710, a constraint member 720, and a guide part 730.

The body part 710 is disposed between the second driver 300 and the parking gear part 600. The body part 710 receives a driving force generated by the second driver 300 through the locking part 800 which will be described below, and linearly reciprocates between the second driver 300 and the parking gear part 600. The body part 710 in accordance with the embodiment of the present disclosure is formed in substantially a rod shape, and disposed between the second driver 300 and the parking gear part 600. The longitudinal direction of the body part 710 is set in parallel to the output shaft of the second driver 300.

The constraint member 720 is extended from the body part 710. As the body part 710 is moved by a predetermined distance or more toward the parking gear part 600, the constraint member 720 is brought into surface contact with the parking gear part 600, thereby constraining the rotation of the parking gear part 600.

The constraint member 720 in accordance with the embodiment of the present disclosure includes a first constraint member 721 and a second constraint member 722.

The first constraint member 721 is extended from the body part 710. As the body part 710 is moved by a predetermined distance or more toward the parking gear part 600, the first constraint member 721 is brought into contact with one surface of the parking gear part 600.

The first constraint member 721 in accordance with the embodiment of the present disclosure may be formed in the shape of a rod which is bent and extended from the front end of the body part 710 toward the parking gear part 600. As the body part 710 is moved by a predetermined distance or more toward the parking gear part 600, the inner surface of the first constraint member 721 is brought into contact with an outer surface of the parking gear part 600. In this case, since the parking gear part 600 has a polygonal cross-section, the inner surface of the first constraint member 721 is brought into surface contact with any one surface (bottom surface in FIG. 3) of the outer surfaces of the parking gear part 600.

The second constraint member 722 is extended from the body part 710, and spaced apart by a predetermined distance from the first constraint member 721 while facing the first constraint member 721. As the body part 710 is moved by a predetermined distance or more toward the parking gear part 600, the second constraint member 722 is brought into contact with another outer surface of the parking gear part 600.

The second constraint member 722 in accordance with the embodiment of the present disclosure may be formed in the shape of a rod which is bent and extended from the front end of the body part 710 toward the parking gear part 600. The inner surface of the second constraint member 722 is disposed in parallel to the inner surface of the first constraint member 721, while facing the inner surface of the first constraint member 721. The inner surface of the second constraint member 722 is spaced apart, by the width of the parking gear part 600, from the inner surface of the first constraint member 721. Therefore, the space into which the parking gear part 600 may be inserted may be provided between the inner surfaces of the first and second constraint members 721 and 722.

As the body part 710 is moved by a predetermined distance or more toward the parking gear part 600, the inner surface of the second constraint member 722 is brought into contact with an outer surface of the parking gear part 600. Since the parking gear part 600 has a polygonal cross-section, the inner surface of the second constraint member 722 is brought into surface contact with a surface (top surface in FIG. 3) parallel to the outer surface of the parking gear part 600 brought into contact with the first constraint member 721. Thus, the second constraint member 722 may be brought into surface contact with the parking gear part 600 at two surfaces with the first constraint member 721, thereby more stably constraining the rotation of the parking gear part 600.

The guide part 730 abuts on the constraint member 720, and guides the movement of the body part 710. The guide part 730 in accordance with the embodiment of the present disclosure may be formed in the shape of a pair of plates which are extended from the housing 100 and have inner surfaces spaced apart from each other while facing each other, or a hollow pipe fixed to the housing 100. The guide part 730 is extended in a longitudinal direction thereof, corresponding to the longitudinal direction of the body part 710. Both inner surfaces of the guide part 730 are disposed in parallel to the outer surfaces of the first and second constraint members 721 and 722, while facing the outer surfaces of the first and second constraint members 721 and 722. Both inner surfaces of the guide part 730 abut on the outer surfaces of the first and second constraint members 721 and 722, respectively, and slidably support the first and second constraint members 721 and 722. Thus, the guide part 730 may guide the body part 710 to linearly reciprocate along a preset path.

The locking part 800 is provided between the second driver 300 and the constraint part 700, and transfers the driving force generated by the second driver 300 to the constraint part 700. The locking part 800 restricts from the output shaft of the second driver 300 from rotating in the reverse direction such that the constraint part 700 is moved to the other side, during parking braking. That is, the locking part 800 functions as a medium that transfers power between the second driver 300 and the constraint part 700. Simultaneously, when the operation of the second driver 300 is stopped, the locking part 800 functions to restrict the output shaft of the second driver 300 from randomly rotating in the reverse direction, through a self locking operation.

Figure 6:
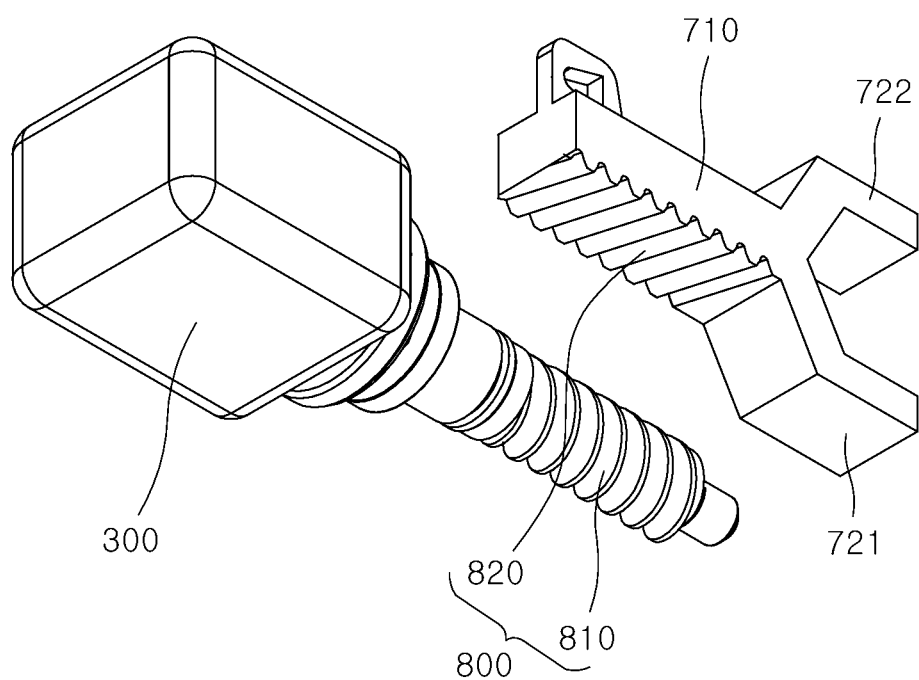
FIG. 6 is an exploded perspective view schematically illustrating the configuration of a locking part in accordance with the embodiment of the present disclosure.

FIG. 6 is an exploded perspective view schematically illustrating the configuration of the locking part in accordance with the embodiment of the present disclosure.

Referring to FIGS. 4 to 6, the locking part 800 in accordance with the embodiment of the present disclosure includes a first locking member 810 and a second locking member 820.

The first locking member 810 is connected to and rotated by the output shaft of the second driver 300. The first locking member 810 in accordance with the embodiment of the present disclosure may be formed in the shape of a worm gear which has gear teeth formed helically on the outer circumferential surface thereof and extended in the longitudinal direction thereof. The central axis of the first locking member 810 is located coaxially with the output shaft of the second driver 300. The first locking member 810 is connected to the output shaft of the second driver 300, and rotated on the central axis thereof with the output shaft of the second driver 300, during the operation of the second driver 300.

The second locking member 820 protrudes from the constraint part 700, and is engaged with the first locking member 810 so as to convert a rotational motion of the first locking member 810 into a linear motion of the constraint part 700. Through a self locking force which is generated when the second locking member 820 is engaged with the first locking member 810, the second locking member 820 constrains the rotation of the output shaft of the second driver 300, when the operation of the second driver 300 is stopped. The second locking member 820 in accordance with the embodiment of the present disclosure may be formed in the shape of a rack gear which protrudes from the rear bottom surface of the body part 710, and is engaged and coupled with the first locking member 810.

Figure 7:
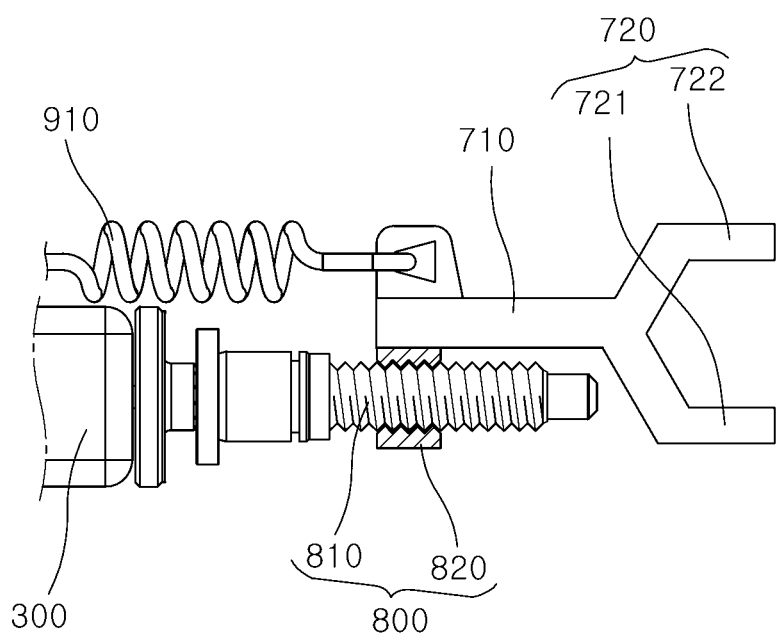
FIG. 7 is a cross-sectional view schematically illustrating the configuration of a locking part in accordance with another embodiment of the present disclosure.

FIG. 7 is a cross-sectional view schematically illustrating the configuration of a locking part in accordance with another embodiment of the present disclosure.

Referring to FIG. 7, any one of the first and second locking members 810 and 820 in accordance with the another embodiment of the present disclosure may be provided in the shape of a bolt screw, and the other of the first and second locking members 810 and 820 may be provided in the shape of a nut screw. FIG. 7 illustrates that the first locking member 810 is provided in the shape of a bolt screw, and the second locking member 820 is provided in the shape of a nut screw. On the contrary, however, the first locking member 810 may be provided in the shape of a nut screw, and the second locking member 820 may be provided in the shape of a bolt screw.

The adjuster 900 is connected to the constraint part 700, and limits the moving range of the constraint part 700 toward the parking gear part 600. Thus, the adjuster 900 may prevent damage to the parts, which may be caused by a collision between the constraint part 700 and the parking gear part 600 during parking braking.

Figure 8:
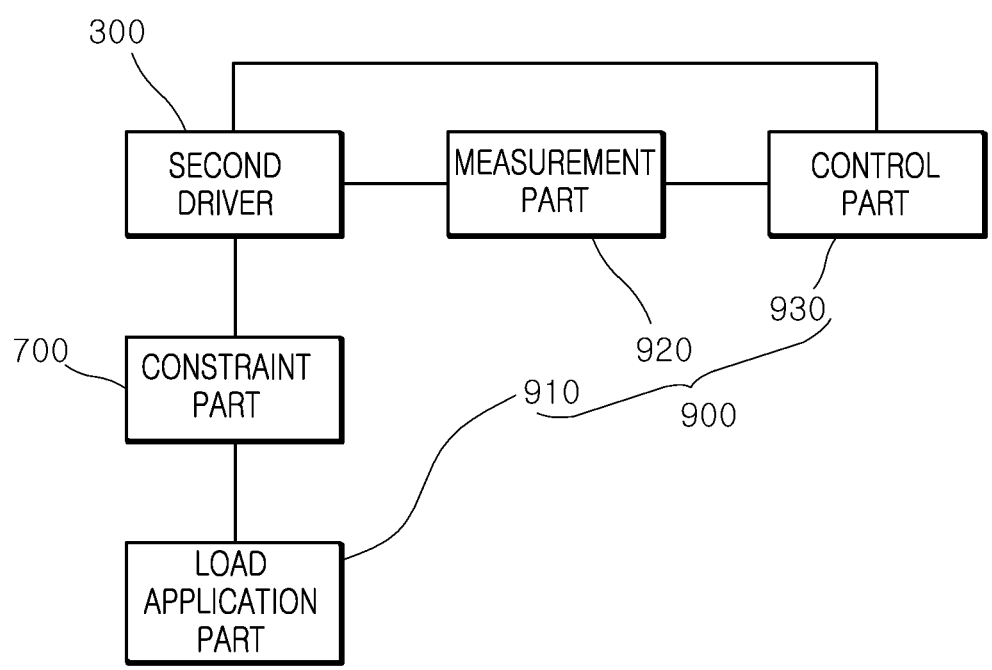
FIG. 8 is a block diagram schematically illustrating the configuration of an adjuster in accordance with the embodiment of the present disclosure.

FIG. 8 is a block diagram schematically illustrating the configuration of the adjuster in accordance with the embodiment of the present disclosure.

Referring to FIGS. 4 and 8, the adjuster 900 in accordance with the embodiment of the present disclosure includes a load application part 910, a measurement part 920, and the control part 930.

The load application part 910 applies a load to the constraint part 700 in the opposite direction of the moving direction of the constraint part 700 in proportion to the moving distance of the constraint part 700. That is, as the constraint part 700 approaches the parking gear part 600, the load application part 910 may linearly increase the magnitude of a load applied to the second driver 300, thereby inducing an increase in current value of the second driver 300. The load application part 910 in accordance with the embodiment of the present disclosure may be formed in the shape of a coil spring which can be elastically deformed in a direction parallel to the moving direction of the constraint part 700. Both sides of the load application part 910 may be fixed to and supported by the rear end of the body part 710 and the inner surface of the housing 100, respectively. In this case, the load application part 910 is extended in the longitudinal direction thereof as the constraint part 700 is moved toward the parking gear part 600, and applies a tensile force to the constraint part 700.

Figure 9:
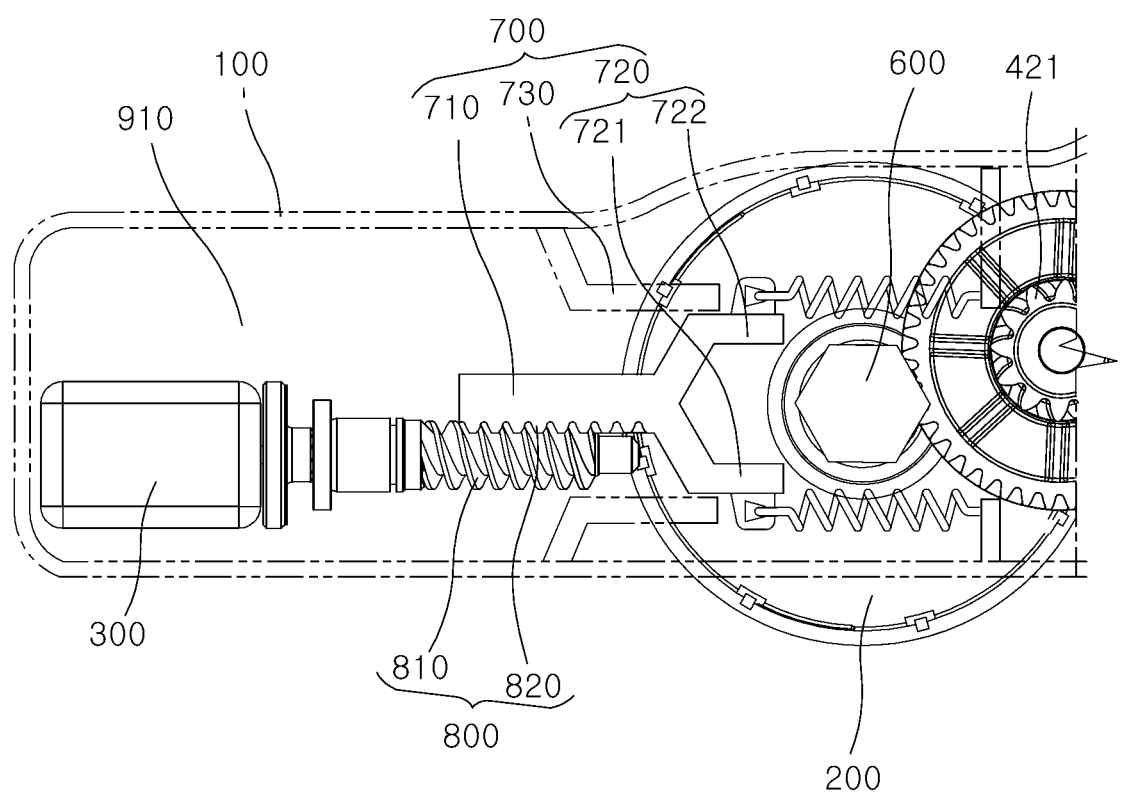
FIG. 9 is a front view schematically illustrating that a load application part in accordance with another embodiment is installed.

FIG. 9 is a front view schematically illustrating that a load application part in accordance with another embodiment is installed.

Referring to FIG. 9, the load application part 910 in accordance with the another embodiment of the present disclosure may have both sides fixed to and supported by the front end of the constraint member 720 and the inner surface of the housing 100, respectively. More specifically, the load application part 910 may be provided as a pair of load application parts whose one sides are fixed to the front end of the first constraint member 721 and the front end of the second constraint member 722, respectively. In this case, the load application part 910 applies a pressing force to the constraint part 700 while compressed in the longitudinal direction thereof as the constraint part 700 is moved toward the parking gear part 600. The installation positions of the load application part 910 are not limited to those illustrated in FIGS. 4 and 9, but can be variously changed in design as long as the load application part 910 can apply a load to the constraint part 700 in the opposite direction of the moving direction of the constraint part 700 in proportion to the moving distance of the constraint part 700.

The measurement part 920 measures the current value of the second driver 300. The measurement part 920 in accordance with the embodiment of the present disclosure may be connected to the second driver 300, and exemplified as various types of current sensors which can measure the magnitude of a current flowing through the second driver 300 during the operation of the second driver 300.

The control part 930 may be an electric circuitry (e.g., a processor, an ASIC (Application Specific Integrated Circuit), a DSP (Digital Signal Processor), a DSPD (Digital Signal Processing Device), a PLD (Programmable Logic Device), a FPGA (Field Programmable Gate Array), a microcontroller, microprocessor) that executes instructions of software which thereby performs various functions described hereinafter. The control part 930 stops the operation of the second driver 300 when the current value of the second driver 300, measured by the measurement part 920, exceeds a preset magnitude. The present current value at which the control part 930 stops the operation of the second driver 300 can be changed in design to various values in the range of current values measured by the measurement part 920 at the point of time that the first constraint member 721 and the second constraint member 722 are brought into surface contact with the parking gear part 600. Thus, the control part 930 may prevent the constraint member 720 from excessively moving toward the parking gear part 600 and colliding with the parking gear part 600 or prevent an unnecessary load from being applied to the second driver 300. The control part 930 in accordance with the embodiment of the present disclosure may include a communication unit configured to receive data on the current value measured by the measurement part 920 through a wired or wireless method, and an electronic control unit configured to compare the current value measured by the measurement part 920 to the preset current value and adjust the operation state of the second driver 300.

Hereafter, an operation process of the brake apparatus for a vehicle in accordance with the embodiment of the present disclosure will be described in detail.

Figure 10:
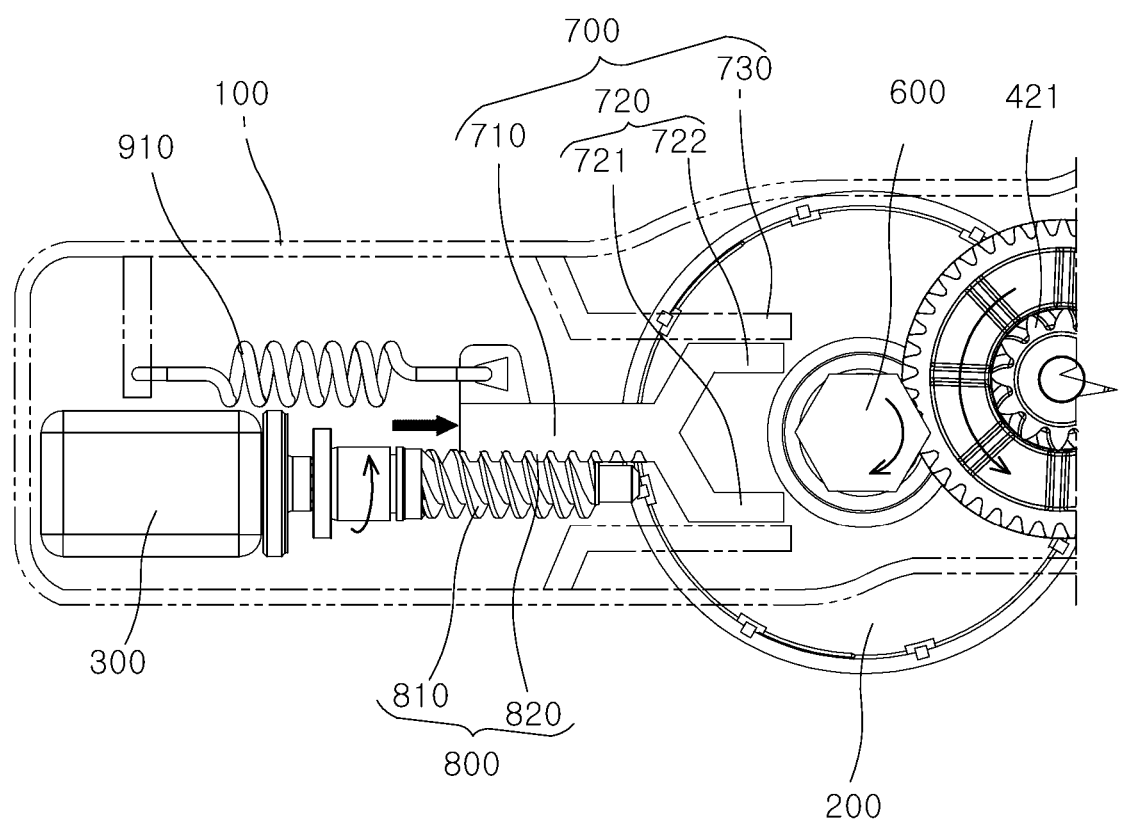
FIGS. 10 and 11 are operation diagrams schematically illustrating an operation process of the brake apparatus for a vehicle in accordance with the embodiment of the present disclosure.
Figure 11:
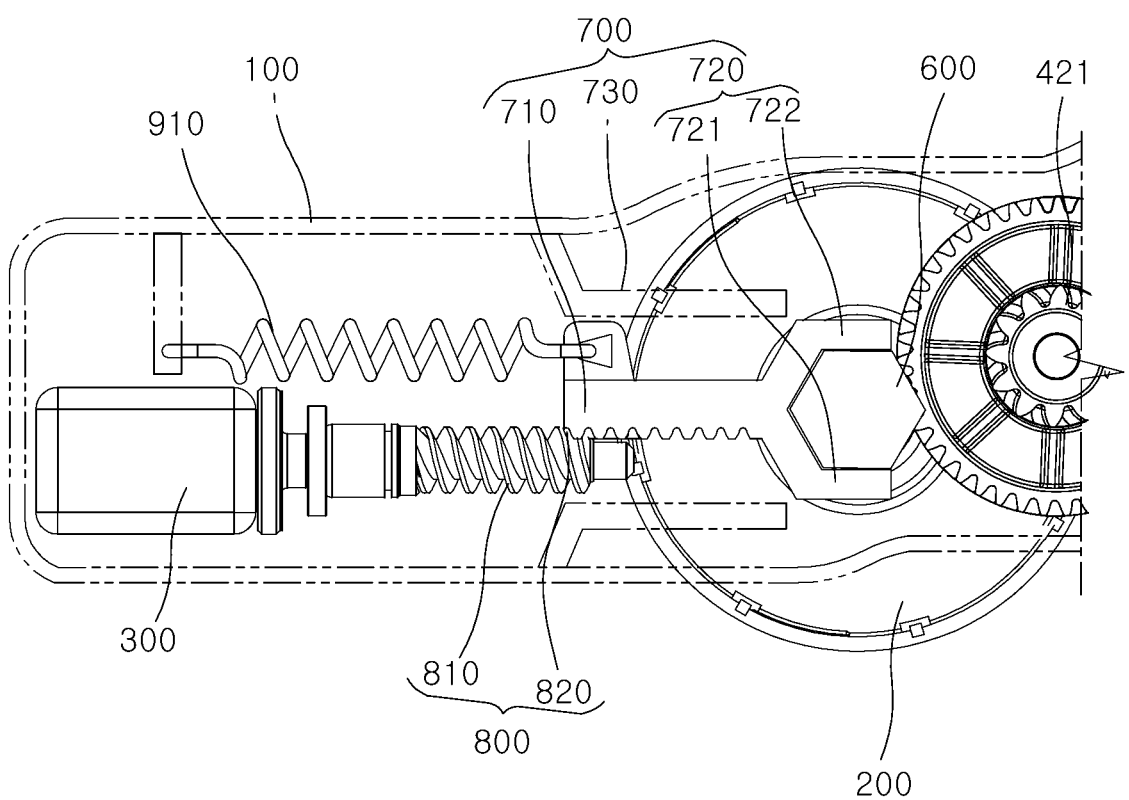

FIGS. 10 and 11 are operation diagrams schematically illustrating an operation process of the brake apparatus for a vehicle in accordance with the embodiment of the present disclosure.

Referring to FIGS. 10 and 11, the first driver 200 generates a driving force to rotate the transfer gear part 400, during a parking braking operation of the vehicle.

The driving force generated by the first driver 200 is transferred to the ball screw 510 of the piston part 500 after sequentially passed through the first transfer gear part 410, the second transfer gear part 420, and the third transfer gear part 430.

As the ball screw 510 is rotated on the central axis thereof, the ball nut 520 is moved forward through the cyclic movement of the rolling body 530.

The piston member 540 is moved forward with the ball nut 520 and brought into contact with the pad part 20, and generates a parking braking force by pressing the pad part 20 toward the brake disk.

Then, as a sufficient parking braking force is generated, the second driver 300 generates a driving force, and the constraint part 700 is moved toward the parking gear part 600 in connection with the driving force of the second driver 300.

More specifically, as the output shaft of the second driver 300 is rotated, the first locking member 810 is also rotated on the central axis thereof with the output shaft of the second driver 300.

The second locking member 820 engaged with the first locking member 810 converts the rotational motion of the first locking member 810 into a linear motion, and moves the body part 710 toward the parking gear part 600.

As the body part 710 is moved by a predetermined distance or more toward the parking gear part 600, the inner surfaces of the first and second constraint members 721 and 722 are brought into contact with the outer surfaces of the parking gear part 600.

The load application part 910 applies a load to the constraint part 700 in the opposite direction of the moving direction of the constraint part 700, i.e. the direction in which the constraint part 700 is away from the parking gear part 600, in proportion to the moving distance of the constraint part 700.

Thus, as the constraint part 700 approaches the parking gear part 600, the magnitude of the load applied to the second driver 300 linearly increases. Such an increase in the load raises the current value of the second driver 300.

The control part 930 stops the operation of the second driver 300, as the current value of the second driver 300, measured by the measurement part 920, exceeds the preset magnitude.

When the operation of the second driver 300 is stopped, the first locking member 810 and the second locking member 820 constrain the reverse rotation of the second driver 300 by using a self locking force generated by the frictional force therebetween.

Therefore, the constraint member 720 may not collide with the parking gear part 600, but maintain the surface contact with the parking gear part 600.

Then, the generation of the driving force by the first driver 200 is stopped, and a rotational force acting in the opposite direction of the rotational force transferred during parking braking is transferred to the parking gear part 600 by a reaction force generated between the piston member 540 and the pad part 20.

The constraint member 720 offsets such a rotational force by using a locking coupling force with the parking gear part 600, thereby constraining the rotation of the parking gear part 600.

As the rotation of the parking gear part 600 is constrained, the rotations of the output shaft of the first driver 200 and the transfer gear part 400 may also be constrained to maintain the parking braking state.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A brake apparatus for a vehicle, comprising:
   a first driver and a second driver each configured to generate a driving force;
   a transfer gear part rotated by the driving force received from the first driver;
   a piston part moved forward or backward in connection with a rotation of the transfer gear part, and configured to press or release a pad part according to a direction in which the piston part is moved forward or backward;
   a parking gear part rotated with the transfer gear part;
   a constraint part moved forward or backward by the driving force of the second driver, and configured to constrain a rotation of the parking gear part by being moved to one side during parking braking;
   a locking part configured to transfer the driving force, generated by the second driver, to the constraint part, and to restrict the constraint part from moving to the other side during parking braking; and
   an adjuster connected to the constraint part, and configured to limit a moving range of the constraint part toward the parking gear part,
   wherein the adjuster comprises:
   a load application part configured to apply a load to the constraint part in an opposite direction of a moving direction of the constraint part in proportion to a moving distance of the constraint part;
   a measurement part configured to measure a current value of the second driver; and
   a control part configured to stop an operation of the second driver when the current value of the second driver, measured by the measurement part, exceeds a preset magnitude.

2. The brake apparatus of claim 1, wherein the constraint part comprises:
   a body part configured to linearly reciprocate between the second driver and the parking gear part;
   a constraint member extending from the body part, and brought into surface contact with the parking gear part, as the body part is moved by a predetermined distance or more toward the parking gear part; and
   a guide part configured to abut on the constraint member, and to guide a movement of the body part.

3. The brake apparatus of claim 2, wherein the constraint member comprises:
   a first constraint member brought into contact with one surface of the parking gear part; and
   a second constraint member spaced apart from the first constraint member so as to face the first constraint member, and brought into contact with another surface of the parking gear part.

4. The brake apparatus of claim 3, wherein the first constraint member and the second constraint member are disposed in parallel to each other.

5. The brake apparatus of claim 3, wherein the first constraint member and the second constraint member are spaced apart, by a width of the parking gear part, from each other.

6. The brake apparatus of claim 1, wherein the locking part comprises:
a first locking member connected to and rotated by an output shaft of the second driver; and
a second locking member protruding from the constraint part, and configured to convert a rotational motion of the first locking member into a linear motion by being engaged with the first locking member.

7. The brake apparatus of claim 6, wherein the first locking member and second locking member are engaged with each other, and when an operation of the second driver is stopped, the second locking member constrains a rotation of the output shaft of the second driver.

8. The brake apparatus of claim 7, wherein the first locking member is provided in a shape of a worm gear.

9. The brake apparatus of claim 7, wherein any one of the first locking member or the second locking member is provided in a shape of a ball screw, and a remaining one of the first locking member or the second locking member is provided in a shape of a nut screw.

10. The brake apparatus of claim 1, wherein the load application part is elastically deformable in a direction parallel to the moving direction of the constraint part.

11. The brake apparatus of claim 1, wherein the transfer gear part comprises:
a first transfer gear part rotated with an output shaft of the first driver;
a second transfer gear part engaged and coupled with the first transfer gear part, and rotated in connection with a rotation of the first transfer gear part; and
a third transfer gear part engaged and coupled with the second transfer gear part, rotated in connection with a rotation of the second transfer gear part, and configured to transfer a rotational force to the piston part.

12. The brake apparatus of claim 11, wherein the parking gear part is connected to the output shaft of the first driver, and rotated at a same angular velocity as that of the first transfer gear part.

13. The brake apparatus of claim 11, wherein the parking gear part has a polygonal cross-section.

14. The brake apparatus of claim 1, wherein the piston part comprises:
a ball screw connected to and rotated by the transfer gear part;
a ball nut configured to linearly reciprocate in a longitudinal direction of the ball screw in connection with a rotation of the ball screw; and
one or more rolling bodies arranged between the ball screw and the ball nut, and configured to come into rolling contact with the ball screw and the ball nut.

15. The brake apparatus of claim 1, wherein diameters of the first, second, and third transfer gear parts have an ascending relationship from the first transfer gear part toward the third transfer gear part.

* * * * *